US012608559B2

(12) United States Patent
Kumar et al.

(10) Patent No.: US 12,608,559 B2
(45) Date of Patent: Apr. 21, 2026

(54) METHOD AND SYSTEM FOR ENHANCING A MUTIMODAL INPUT CONTENT

(71) Applicant: SAMSUNG ELECTRONICS CO., LTD., Suwon-si (KR)

(72) Inventors: Sumit Kumar, Bengaluru (IN); Barath Raj Kandur Raja, Bengaluru (IN); Yashwant Singh Saini, Bengaluru (IN); Sourabh Vasant Gothe, Bengaluru (IN); Harichandana Bhogaraju Swarajya Sai, Bengaluru (IN); Chandramouli Sanchi, Bengaluru (IN); Himanshu Arora, Bengaluru (IN); Vibhav Agarwal, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 365 days.

(21) Appl. No.: 18/132,165

(22) Filed: Apr. 7, 2023

(65) Prior Publication Data

US 2023/0252243 A1 Aug. 10, 2023

Related U.S. Application Data

(63) Continuation of application No. PCT/KR2023/001576, filed on Feb. 3, 2023.

(30) Foreign Application Priority Data

Feb. 4, 2022 (IN) ............................ 202241006189

(51) Int. Cl.
*G06F 16/00* (2019.01)
*G06F 16/335* (2019.01)
(Continued)

(52) U.S. Cl.
CPC ............ *G06F 40/40* (2020.01); *G06F 16/337* (2019.01); *G06F 40/232* (2020.01); *G06F 40/284* (2020.01)

(58) Field of Classification Search
None
See application file for complete search history.

(56) References Cited

U.S. PATENT DOCUMENTS 6,185,524 B1 2/2001 Carus et al.
7,899,670 B1 3/2011 Young et al.
(Continued)

FOREIGN PATENT DOCUMENTS

CN 111259151 A * 6/2020 ....... G06F 16/90344
IN 202041009659 A 10/2021
(Continued)

OTHER PUBLICATIONS

Kumar, Sumit, B. S. S. Harichandana, and Himanshu Arora. "Voicemoji: A novel on-device pipeline for seamless emoji insertion in dictation." 2021 IEEE 18th India Council International Conference (INDICON). IEEE, 2021. (Year: 2021).*
(Continued)

*Primary Examiner* — Shreyans A Patel
(74) *Attorney, Agent, or Firm* — Sughrue Mion, PLLC

(57) ABSTRACT

Present disclosure relates to a method and a user equipment (UE) for enhancing multimodal input content. The UE obtains text-blocks associated with multimodal input and determines a plurality of features for each of the text-blocks using a natural language processing (NLP) model and a neural network (NN) model. Further, the UE identifies usage pattern of the plurality of features based on historic data associated with the usage of the plurality of features using NN model. Thereafter, the UE generates personalized text for each of the textblocks based on the plurality of features
(Continued)

and usage pattern. The UE inserts personalized emoticons based on context of text-blocks and lingo of each word using user lingo database. Thus, the UE eliminates manual correction of texts and enhances the readability of message/text entered by user.

15 Claims, 10 Drawing Sheets

(51) Int. Cl.

| | |
|---|---|
| ***G06F 40/232*** | (2020.01) |
| ***G06F 40/284*** | (2020.01) |
| ***G06F 40/40*** | (2020.01) |

(56) References Cited

U.S. PATENT DOCUMENTS

| | | | | |
|---|---|---|---|---|
| 8,275,618 | B2 | 9/2012 | Ganong, III | |
| 10,387,565 | B2 | 8/2019 | Hoover et al. | |
| 2008/0077406 | A1 | 3/2008 | Ganong, III | |
| 2014/0165002 | A1 | 6/2014 | Grove | |
| 2017/0344224 | A1 | 11/2017 | Kay et al. | |
| 2018/0109482 | A1* | 4/2018 | DeLuca | G06N 20/00 |
| 2019/0121841 | A1* | 4/2019 | Sbodio | G06F 40/279 |
| 2020/0379725 | A1 | 12/2020 | Dhillon et al. | |
| 2020/0401796 | A1* | 12/2020 | Chateigner | G06F 40/151 |
| 2021/0124422 | A1* | 4/2021 | Forsland | G06N 20/00 |
| 2021/0192143 | A1* | 6/2021 | DeFelice | G06F 40/56 |
| 2022/0004872 | A1* | 1/2022 | Raja | G06F 16/24578 |

FOREIGN PATENT DOCUMENTS

| | | | | |
|---|---|---|---|---|
| WO | WO-2014060739 A1 * | 4/2014 | | G06F 40/274 |
| WO | WO-2021207422 A1 * | 10/2021 | | G06F 40/205 |

OTHER PUBLICATIONS

Communication issued Mar. 3, 2025 by the Intellectual Property Office of India in Indian Patent Application No. 202241006189.
Communication dated May 22, 2023, issued by the International Searching Authority in counterpart International Application No. PCT/KR2023/001576 (PCT/ISA/210).
Communication dated May 22, 2023, issued by the International Searching Authority in counterpart International Application No. PCT/KR2023/001576 (PCT/ISA/237).
Alex Graves et al., "Connectionist Temporal Classification: Labelling Unsegmented Sequence Data with Recurrent Neural Networks", 2006, (8 pages).
Chung-Cheng Chiu et al., "Monotonic Chunkwise Attention", Feb. 23, 2018, (16 pages).
Ashish Vaswani et al., "Attention Is All You Need", Dec. 6, 2017, (15 pages).
Alex Graves, "Sequence Transduction with Recurrent Neural Networks", Department of Computer Science, Nov. 14, 2012, (9 pages).
Qian Zhang et al., "Transformer Transducer: A Streamable Speech Recognition Model With Transformer Encoders and RNN-T Loss", Feb. 14, 2020, (5 pages).
Wei Han et al., "ContextNet: Improving Convolutional Neural Networks for Automatic Speech Recognition with Global Context", May 16, 2020, (5 pages).
Anmol Gulati et al., "Conformer: Convolution-Augmented Transformer for Speech Recognition", May 16, 2020, (5 pages).
Kwangyoun Kim et al., "Attention Based On-Device Streaming Speech Recognition With Large Speech Corpus," Jan. 2, 2020, (8 pages).
CoNLL-2013 Shared Task: Grammatical Error Correction, 2013, [https://www.comp.nus.edu.sg/~nlp/conll13st.html], (2 pages).
Eric Enge, "Mobile Voice Usage Trends in 2020", Jun. 30, 2020, [https://blogs.perficient.com/2020/06/30/mobile-voice-usage-trends-in-2020/], (20 pages).
Laurent Dupercal, "Voice Dictation For Writers: The Ultimate Guide To Speed Up Your Writing In 2020", Apr. 21, 2020 [https://medium.com/@writing_75544/voice-dictation-for-writers-the-ultimate-guide-to-speed-up-your-writing-in-2020-4944c0138120], (41 pages).
Bixby Punctuation, 2017, [https://www.reddit.com/r/GalaxyS8/comments/6vprha/help_bixby_punctuation/], (7 pages.
IPhone Voice Dictation Commands and Punctuation, Feb. 28, 2014, [https://www.iphonetricks.org/iphone-voice-dictation-commands-and-punctuation/], (13 pages).
Sourabh Vasant Gothe et al., "An efficient system for grammatical error correction on mobile devices", 2021 IEEE 15th International Conference on Semantic Computing (ICSC), 2021, pp. 147-154, doi: 10.1109/ICSC50631.2021.00034.
Sherry Ruan et al., "Speech Is 3x Faster than Typing for English and Mandarin Text Entry on Mobile Devices", arXiv:submit/1646347 [cs.HC], 2016, 12 pages.
Communication issued Dec. 17, 2025 by the Indian Patent Office in Indian Patent Application No. 202241006189.

* cited by examiner

FIG. 2

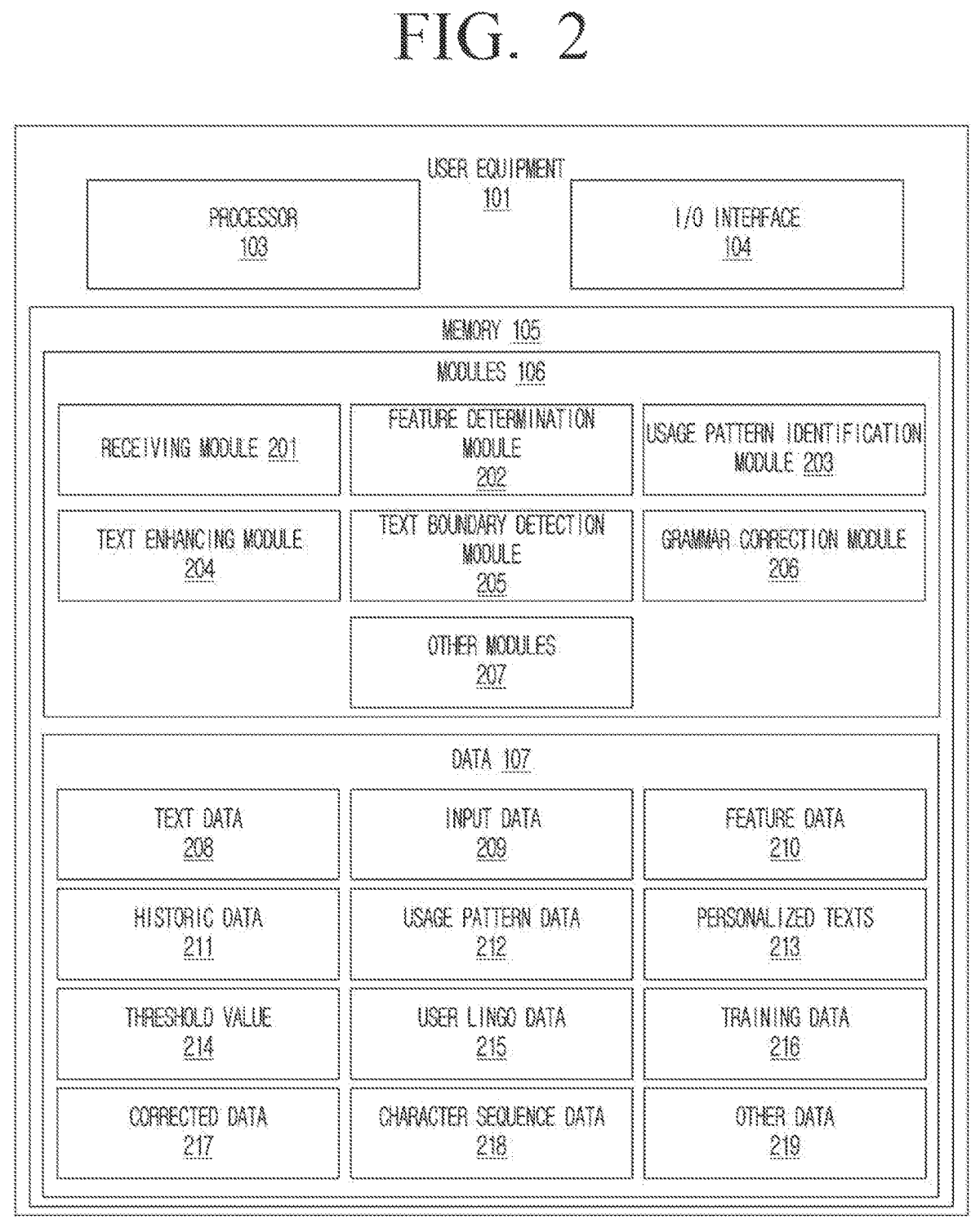

USER EQUIPMENT 101
PROCESSOR 103
I/O INTERFACE 104
MEMORY 105
MODULES 106
RECEIVING MODULE 201
FEATURE DETERMINATION MODULE 202
USAGE PATTERN IDENTIFICATION MODULE 203
TEXT ENHANCING MODULE 204
TEXT BOUNDARY DETECTION MODULE 205
GRAMMAR CORRECTION MODULE 206
OTHER MODULES 207
DATA 107
TEXT DATA 208
INPUT DATA 209
FEATURE DATA 210
HISTORIC DATA 211
USAGE PATTERN DATA 212
PERSONALIZED TEXTS 213
THRESHOLD VALUE 214
USER LINGO DATA 215
TRAINING DATA 216
CORRECTED DATA 217
CHARACTER SEQUENCE DATA 218
OTHER DATA 219

FIG. 3

METHOD AND SYSTEM FOR ENHANCING A MUTIMODAL INPUT CONTENT

CROSS-REFERENCE TO RELATED APPLICATION(S)

This application is a continuation of International Application No. PCT/KR2023/001576 designating the United States, filed on Feb. 3, 2023, in the Korean Intellectual Property Receiving Office, and to Indian Complete Patent Application No. 202241006189, filed on Feb. 4, 2022, in the Indian Patent Office, the disclosures of all of which are incorporated by reference herein in their entireties.

BACKGROUND

1. Field

The present disclosure is related in general to natural language processing and more particularly, but not exclusively, to a method and system for enhancing a multimodal input content.

2. Description of the Prior Art

In recent years with advancement in artificial intelligence and machine learning many speech recognition technologies are developed. The speech recognition technologies enable recognition and translation of spoken language into text (speech to text) through computational linguistics. Speech to text has quickly transcended from everyday use on phones to applications in industries like marketing, banking, medical, and the like. The speech recognition technology saves time of a user as speech to text is faster compared to typing a text. However, the user often needs to provide manual corrections to the speech to text message. For example, consider the user writes a message using speech to text technology. The message is in form of a blob of continuous text with grammatical errors, missing of punctuation marks, and the like. The user needs to manually correct the message by providing punctuation marks to make the message more understandable before sending the message. Currently, there are many existing systems which provide grammar correction to the speech to text message. However, these existing systems provide inaccurate grammar solution on the blob of continuous text. Further, with the existing speech recognition technology, the user needs to manually personalize the message before sharing to another person.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for enhancing a multimodal input content. The method includes obtaining, by a processor of a user equipment (UE), at least one text-block associated with a multimodal input; determining, by the processor, a plurality of features of each of the at least one text-block using a natural language processing (NLP) model, wherein the plurality of features comprises a context of each of the at least one text-block and at least one of gender information, contextual lingo information, and lingo usage information; identifying, by the processor, a usage pattern of the plurality of features based on historic data associated with usage of the plurality of features using a pattern identification neural network (NN) model, wherein the historic data comprises at least one of usage of emoticons and emojis, characteristics of emoticons, lingo usage details, and skin-tone features of emoticons; and enhancing, by the processor, the multimodal input by generating a personalized text for each of the at least one text-block based on the determined plurality of features and the identified usage pattern of the plurality of features.

In an embodiment, the present disclosure relates to a User Equipment (UE) for enhancing a multimodal input content. The UE includes a processor; and a memory communicatively coupled to the processor, wherein the memory is configured to store processor-executable instructions, which, on execution, causes the processor to: obtain at least one text-block associated with a multimodal input; determine a plurality of features of each of the at least one text-block using a natural language processing (NLP) model, wherein the plurality of features comprises context of each of the at least one text-block and at least one of gender information, contextual lingo information, and lingo usage information; identify a usage pattern of the plurality of features based on historic data associated with usage of the plurality of features using a pattern identification neural network (NN) model, wherein the historic data comprises at least one of usage of emoticons and emojis, characteristics of emoticons, lingo usage details, and skin-tone features of emoticons; and enhance the multimodal input by generating a personalized text for each of the at least one text-block based on the determined plurality of features and the identified usage pattern of the plurality of features.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

FIG. 2 shows a detailed block diagram of a User Equipment (UE) for enhancing a multimodal input content, in accordance with some embodiments of the present disclosure;

FIG. 3 illustrates a sequence diagram for detecting one or more text boundaries for a multimodal input, in accordance with some embodiments of present disclosure;

Figure 1:
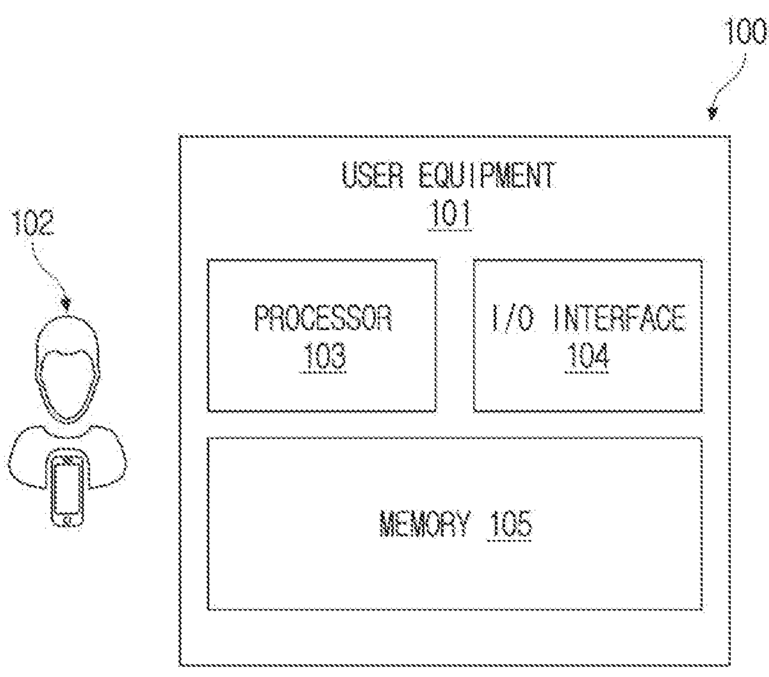
FIG. 1 shows an exemplary environment for enhancing a multimodal input content, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments. While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure. The terms "comprise", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "include", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method. In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. Present disclosure relates to a method and a UE for enhancing a multimodal input content. The UE personalizes text blocks of the multimodal input content. The UE utilizes the text blocks and historic data of a user to determine information such as, gender information, lingo usage information and context of the text blocks. Further, the UE provides a personalized text to the user for the text blocks based on the determined information and its usage. Thus, the present disclosure provides the user with enhanced text comprising personalized emojis, stickers, lingo usage, and the like without having to manually insert them by the user. The present disclosure also eliminates manual correction of the text before sending/sharing the content.

FIG. 1 shows an exemplary environment 100 for enhancing a multimodal input content. The environment 100 may include a User Equipment 101 associated with a user 102. The user 102 may be in communication with the UE 101 for enhancing the multimodal input content. Further, the UE 101 may include a processor 103, I/O interface 104, and a memory 105. In some embodiments, the memory 105 may be communicatively coupled to the processor 103. The memory 105 stores instructions, executable by the processor 103, which, on execution, may cause the UE 101 to enhance the multimodal input content, as disclosed in the present disclosure. The UE 101 may be any computing device, but not limited to, a mobile phone, a tablet, a smart phone, and the like. For example, consider that the user 102 wishes to send a message via the UE 101 to a friend by using speech to text technology. The message spoken by the user 102 is written in form of continuous text. Typically, the user 102 may need to manually personalize the message, insert punctuation marks to make the message more readable before sending to the friend and add personalized content which may not be efficient and time consuming. In present disclosure, such inefficiency and manual work can be eliminated by the processor 103 of the UE 101 which helps in enhancing the content by personalizing the message providing grammar corrections and enhancements, and the like. The UE 101 obtains at least one text block associated with a multimodal input. The multimodal input may be one of, a text message, a voice message and an image input comprising text message. In an embodiment, the at least one text block is obtained by processing the multimodal input to detect one or more text boundaries using a Neural Network (NN) model and a Natural Language Processing (NLP) model. Particularly, upon receiving the multimodal input from the user 102, the UE 101 processes text of the multimodal input by using one or more predefined rules. The one or more predefined rules may include, but is not limited to, converting the text into lower case, separating words with punctuation marks, and the like. Upon processing the text, the UE 101 may convert the processed text into one or more tokens by tokenization. The one or more tokens may be either words, characters, or sub words. Further, the UE 101 indexes each of the one or more tokens. In an embodiment, the one or more tokens are mapped to index using vocabulary. The one or more indexed tokens are padded with predefined bytes. Upon indexing, the UE 101 creates one or more sets of the one or more tokens using the one or more padded tokens. The one or more sets of the one or more tokens is of predefined size. For example, the indexed one or more tokens are padded to create samples of window size six. Further, the UE 101 detects the one or more text boundaries for each of the one or more sets of the one or more tokens using the NN model and the NLP model. In an embodiment, the NN model is trained based on plurality of text input having predefined text boundaries. The NLP model improves the detected one or more text boundaries based on predefined rules.

Upon obtaining the at least one text block, the UE 101 determines a plurality of features of each of the at least one text block using an NLP model. The NLP model is used to understand structure and meaning of human language by analyzing different aspects such as, syntax, semantics, pragmatics, and morphology of the human language. The plurality of features comprises context of each of the at least one text block and at least one of gender information, contextual lingo information, and lingo usage information. For example, consider the text block as "She is dancing", the plurality of features for the text block may include, context of the text block indicating that the user 102 is talking about a person dancing, gender information indicating the person is a female, and the like. For example, consider the text block as "lets meet at mortally". The plurality of features for the text block may include, context of the text block indicating that the user 102 is talking about meeting at a location, the contextual lingo information indicating the location may be Marathahalli, and the like. Upon determining the plurality of features, the UE 101 identifies usage pattern of the determined plurality of features based on historic data using a pattern identification NN model. The pattern identification NN model may be used to identify regularities and similarities in data using machine learning data. The similarities may be found based on statistical analysis, historic data and so on. The pattern identification NN model may include, but is not limited to, Deep Neural Network (DNN), Convolutional Neural Network (CNN), and the like. The historic data is associated with usage of the plurality of features. The historic data may include, but is not limited to, usage of emoticons and emojis, characteristics of emoticons, lingo usage details and skin-tome features of emoticons. Upon identifying the usage pattern, the UE 101 may enhance the multimodal input provided by the user 102 by generating a personalized text for each of the at least one text block. Further, the UE 101 may insert at least one of, one or more emoticons and one or more emojis to the at least one text block with a skin-tone. The skin-tone of the one or more emoticons and the one or more emojis is associated with usage pattern of the user 102. The UE 101 inserts the one or more emoticons and the one or more emojis based on the context of each of the at least one text block and a threshold value. The threshold value is preconfigured based on usage of the at least one of the one or more emoticons and the one or more emojis by the user 102. The threshold value indicates a probability value based on which the at least one of the one or more emoticons and the one or more emojis are inserted at one or more sentences of the at least one text block. In an embodiment, the UE 101 inserts lingo of each word for the at least one text block using a user lingo database. The user lingo database includes information related to plurality of lingo words frequently used by the user 102 during typing. In an embodiment, enhancing of the multimodal input includes performing grammar correction for each of the at least text blocks by using the NN model, the NLP model and an N-gram model. The UE 101 may segment text from each of the at least one text block into one or more words. For example, consider the text block as "All modern houses are usually vary secure" which is segmented into the one or more words i.e., divided into individual words. Upon segmenting, the UE 101 segments the one or more words into plurality of sequence of characters of predefined size. For example, consider the above example, where the one or more words are combined into sequence of characters of the predefined size say four such as "All modern houses are", "modern houses are usually", "houses are usually vary" and "are usually vary secure". Further, the UE 101 may correct the plurality of sequence of characters using the N-gram model. In an embodiment, the N-gram model may be built by counting how often word sequence occur in corpus text and estimating the probabilities. The N-gram model matches the plurality of sequence of characters with prestored sequence of characters and assigns probability value and corrects the plurality of sequence of characters based on the probability value. Further, the UE 101 generates embedding vectors for each of the plurality of corrected sequence of characters using a grammar correction NN model. The output of the grammar correction NN model is converted by UE 101 into one or more tokens of words. Each of the one or more tokens of words is tagged using the NLP model. The tagging of the one or more tokens of words indicates if the word is a noun, adjective, verb and so on. Upon tagging, the UE 101 identifies one or more errors in the one or more tokens of words based on the tagging. The one or more errors may include, but not limited, noun errors, pronoun errors, spelling errors and the like. Upon identifying the errors, the UE 101 corrects the errors based on predefined rules using the NLP model.

FIG. 2 shows a detailed block diagram of a UE for enhancing a multimodal input content, in accordance with some embodiments of the present disclosure. Data 107 and the one or more modules 106 in the memory 105 of the UE 101 is described herein in detail. In one implementation, the one or more modules 106 may include, but are not limited to, a receiving module 201, a feature determination module 202, a usage pattern identification module 203, a text enhancing module 204, a text boundary detection module 205, a grammar correction module 206, and one or more other modules 207, associated with the UE 101. In an embodiment, the data 107 in the memory 105 may include text data 208, input data 209, feature data 210, historic data 211, usage pattern data 212, personalized texts 213, threshold value 214, user lingo data 215, training data 216, corrected data 217, character sequence data 218, and other data 219 associated with the UE 101. In an embodiment, the data 107 in the memory 105 may be processed by the one or more modules 106 of the UE 101. In an embodiment, the one or more modules 108 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a FieldProgrammable Gate Arrays (FPGA), Programmable System-on-Chip (PSoC), a combinational logic circuit, and/or other suitable components that provide the described functionality. One or more modules 108 of the present disclosure function to enhance the multimodal input content. The one or more modules 108 along with the data 109, may be implemented in any UE, for enhancing the multimodal input content for the user 102. The text data 208 includes one or more text blocks associated with multimodal input content. The input data 209 may include one or more multimodal input contents received by a user. The multimodal input contents comprise text messages, voice messages and an image input comprising text message. The feature data 210 may include information such as context of each of the text blocks, gender information from the text-blocks, and lingo usage information. The historic data 211 comprises details about usage of emoticons and emojis, characteristics of emoticons, lingo usage details and skin-tone feature of emoticons used by a user. The usage pattern data 212 may include details about how the plurality of features are used by the user 102 based on the historic data 211. The personalized texts 213 includes the texts which are enhanced by inserting emoticons or emojis, lingo correction and grammar corrections and enhancements. The threshold value 214 is a probability value based on which the one or more emoticons and the one or more emojis are inserted at one or more sentences of the text blocks. The user lingo data 215 includes information related to plurality of lingo words frequently used by the user. The training data 216 include plurality of texts having one or more text boundaries which is used for training the NN model and the NLP model. The corrected data 217 includes plurality of texts corrected by using the grammar correction NN model, N-gram model and the NLP model. The character sequence data 218 include one or more correct sequence of characters used by the N-gram model during grammar correction of the text blocks. The other data 219 may store data, including temporary data and temporary files, generated by modules for performing the various functions of the UE 101. The receiving module 201 may receive at least one text block associated with the multi-modal input from the text boundary detection module 205. Initially, the text boundary detection module 205 receives the multimodal input from the user 102. Upon receiving the multimodal input, the text boundary detection module 205 processes text of the multimodal input using one or more predefined rules. The one or more predefined rules may include, but not limited to, details about how to convert the text into lower case and separate words with punctuation marks. Upon processing the text, the text boundary detection module 205 converts the processed text into one or more tokens. Further, each of the one or more tokens are indexed and padded with predefined bytes. The text boundary detection module 205 creates one or more sets of the one or more tokens using the one or more padded tokens of predefined size. Further, the text boundary detection module 205 detects the one or more text boundaries for each of the one or more sets of the one or more tokens using the NN model and the NLP model. The NN model is trained based on plurality of text input having predefined text boundaries. The NN model may be trained based on plurality of text having one or more text boundaries. For example, the plurality of text with text boundaries may include "Hi Sanjana. How are you?", "Happy birthday Sanjana. Let's have a party", and so on. The NLP model improves the one or more text boundaries based on predefined rules.

Figure 3:
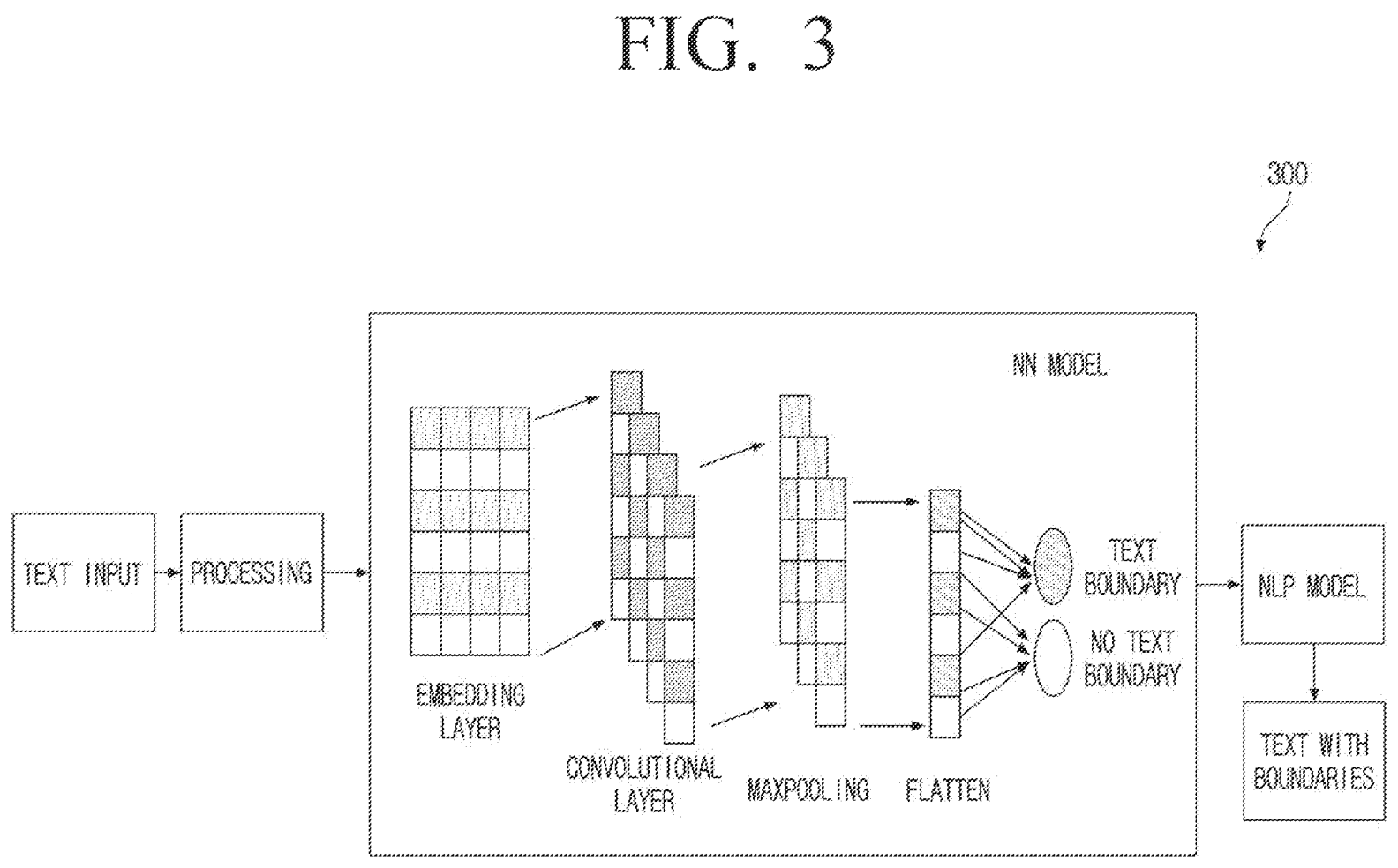

For example, consider FIG. 3, the user 102 provides the multimodal input as text input indicated in FIG. 3. The text input may be voice message such as "Hi Sid how are you doing It's new year soon let's party". The text input is processed using the one or more predefined rules i.e., the text input is converted into lower case and separated into words based on the punctuation marks. For example, the text input is converted into "hi sid how are you doing it's new year soon let's party". Further, the processed text is converted into the into one or more tokens such as [hi], [sid], [how], [are], [you], [doing], [it], ['s], [new], [year], [soon], [let], ['s], [party]. Upon converting into the one or more tokens, each of the one or more tokens are indexed and padded with predefined bytes and the one or more sets of the one or more tokens using the one or more padded tokens of predefined size are created. For example, the tokens are indexed as, hi [10] sid [unknown] how [111] are [209] and so on. Once all the tokens are indexed its padded with predefined bytes and the one or more sets are created with window size six as: sample [0]={[19998] [19998] [19998] [10] 13 [unknown] [111]} i.e., ({[pad], [pad], [pad], [hi], [sid], [how]}); sample [1]={[19998] [19998] [unknown] [111] [29] [199]} i.e., ({[pad], [pad], [sid], [how], [are], [you]}) and so on. Upon creating the one or more sets, the NN model detects the one or more text boundaries for a predefined index for instance at every fourth index for each of the samples i.e., the NN model detects if there is boundary after [hi] for sample [0], if there is a boundary after ['s] for sample [1] and so on. Thus, the boundary detected for the text input is "HiSid how are you doingit's new year soon let's party". Upon detecting the boundaries for each of the sample, the NLP model improves the detected text boundaries based on the predefined rules. The predefined rules may be one or more texts with predefined text boundaries. Thus, the corrected boundaries for the text input are "Hi Sid how are you doingit's new year soon let's party". The text input with boundaries is referred as the text blocks provided to the receiving module 201. Referring back to FIG. 2, upon receiving the text blocks with one or more text boundaries, the feature determination module 202 determines plurality of features for each of the text blocks using the NLP model. The plurality of features may include context of the text blocks, gender information from the text blocks, contextual lingo information of the text block and the lingo usage information. For example, consider the text block as "he is going to ofice". The plurality of features may include the context of the text block indicating the user 102 is talking about a person going to office, gender information indicates the person is a male, and lingo usage information indicates the user 102 often writes office as ofice. Upon identifying the plurality of features, the usage pattern identification module 203 identifies usage pattern of the plurality of features based on the historic data 211 using the pattern identification NN model. The historic data 211 is associated with usage of the plurality of features. The historic data 211 comprises information such as, usage of emoticons and emojis, characteristics of emoticons, lingo usage details and skin-tone feature of emoticons used by the user 102 during messaging. The historic data 211 may be obtained from one or more applications such as social media, messaging application, and the like. Upon identifying the usage pattern, the text enhancing module 204 enhances the multimodal input by generating a 14 personalized text for each of the text blocks based on the plurality of features and the usage pattern of the plurality of features. Further, the text enhancing module 204 may insert at least one of one or more emoticons and one or more emojis to the text blocks with a preferred skin-tone. The one or more emoticons and the one or more emojis are inserted based on the content of each of the text blocks and the threshold value 214. The threshold value 214 is preconfigured based on usage of the one or more emoticons and the one or more emojis by the user 102. The text enhancing module 204 may insert lingo of each word of the text blocks using the user lingo database. The user lingo database includes information related to plurality of lingo words frequently used by the user 102.

Figure 5A:
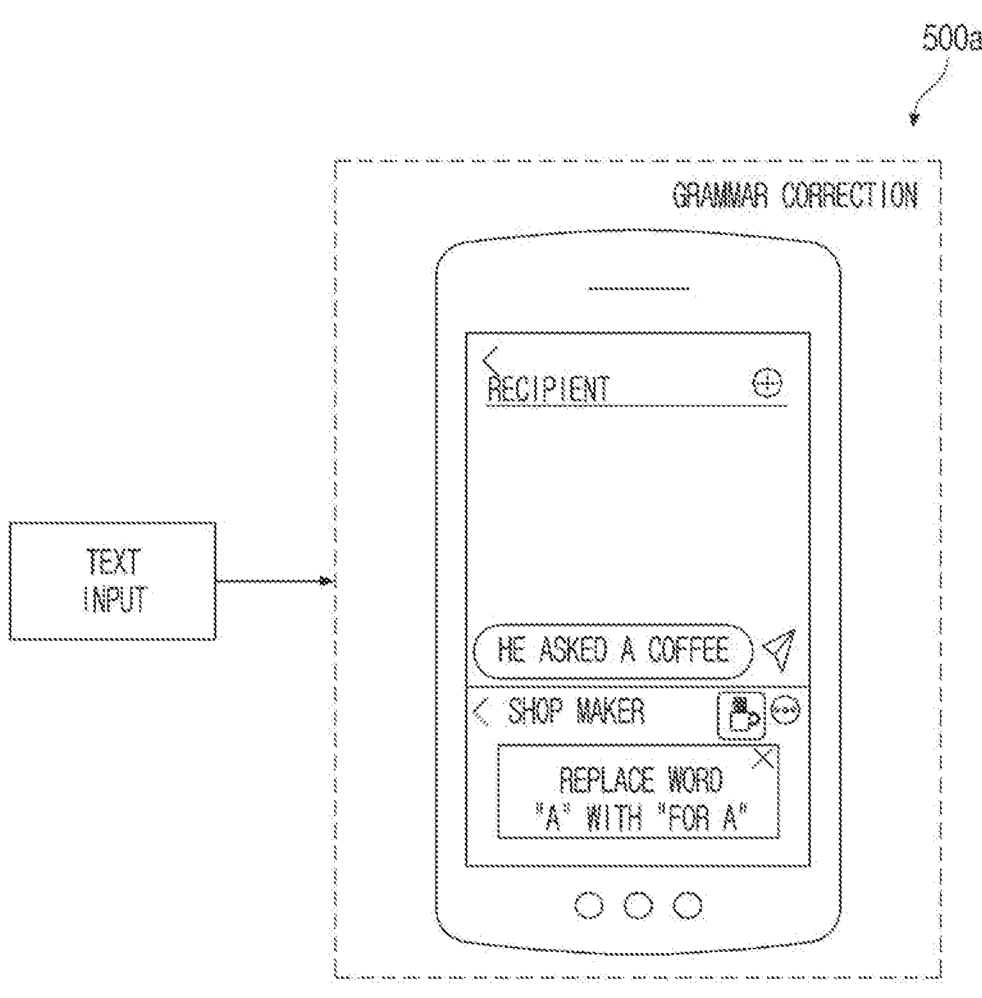
FIGS. 5A, 5B, 5C and 5D illustrate exemplary embodiments for personalizing a multimodal input, in accordance with some embodiments of present disclosure.
Figure 5B:
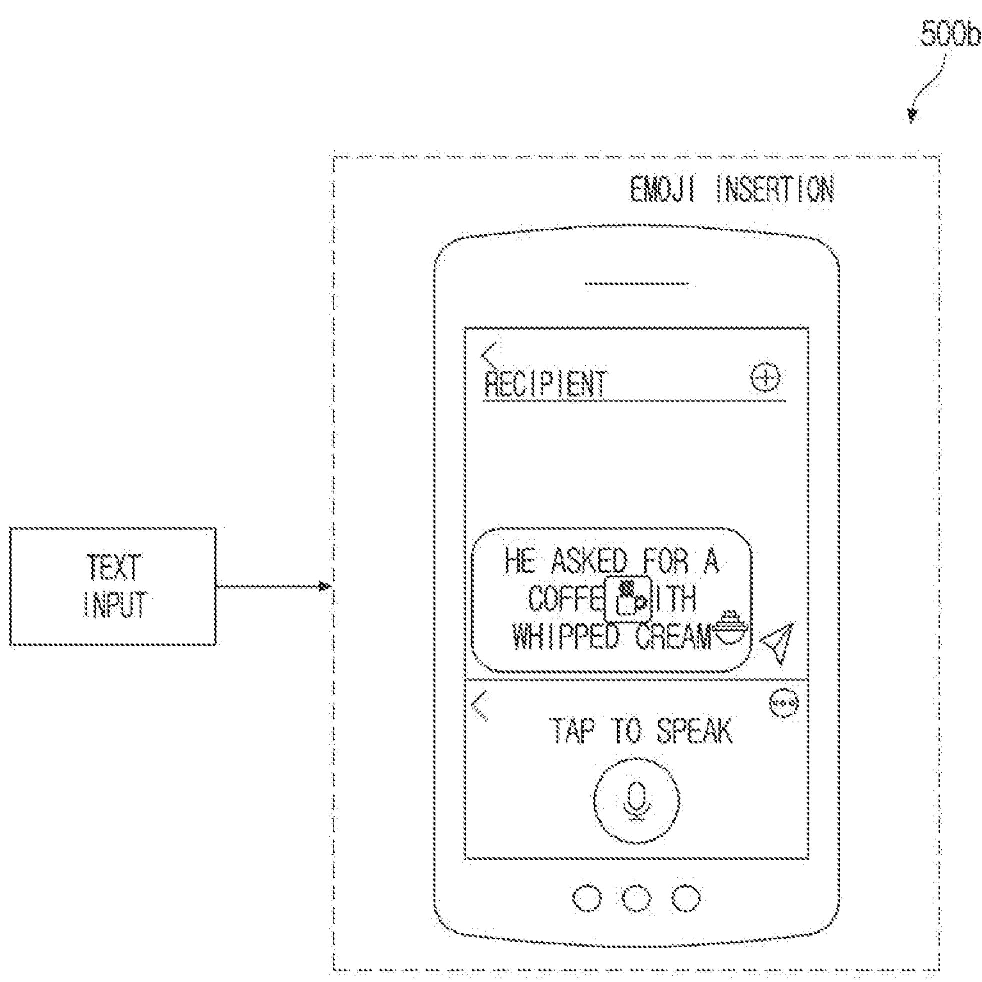
Figure 5C:
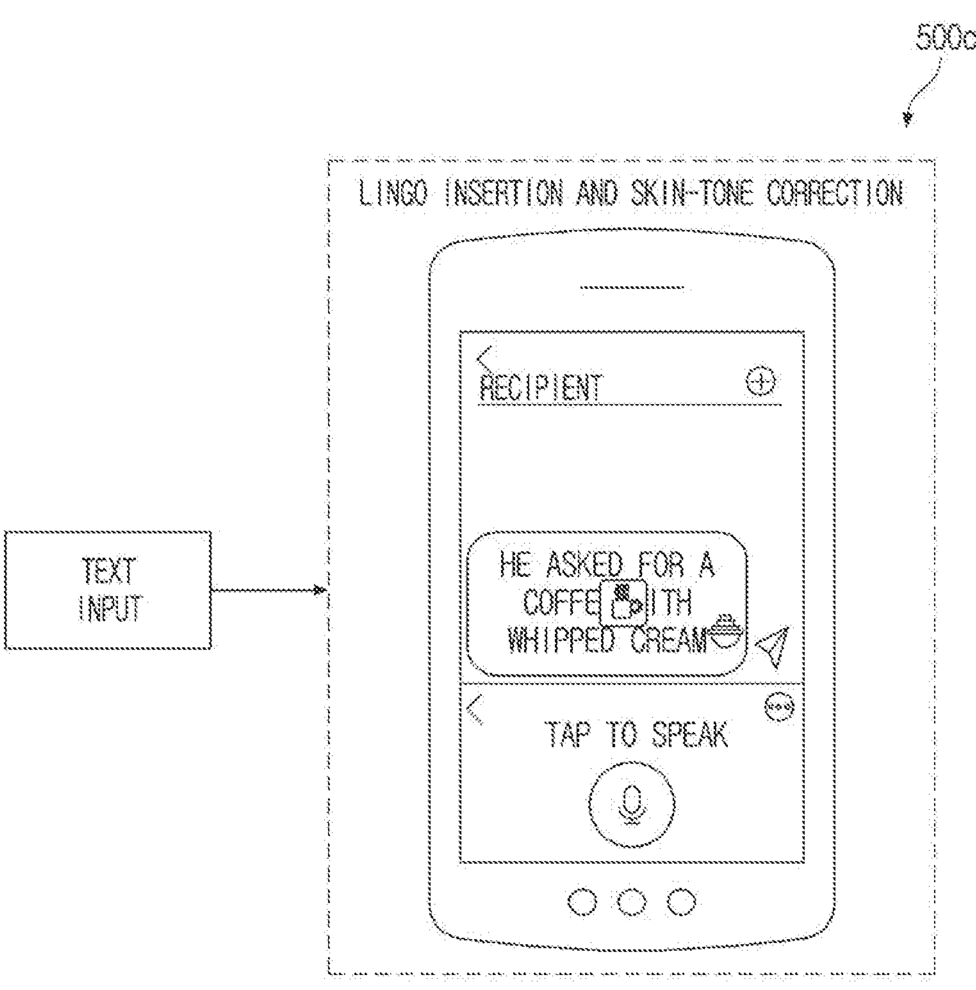
Figure 5D:
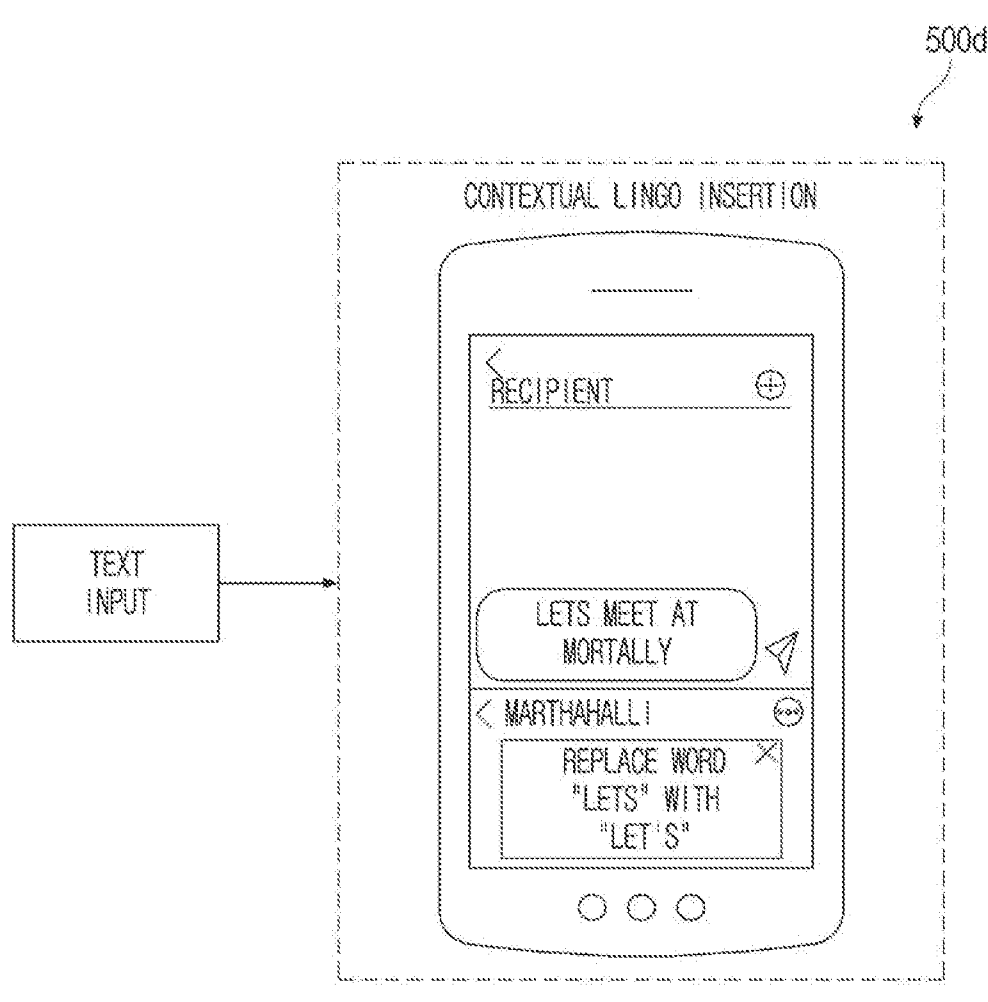

For example, consider FIG. 5B, the text input of the user 102 is "he asked for a coffee with whipped cream". As explained above, for the text input, the text boundary detection module 205 detects the one or more text boundaries for the text input and provides the text blocks. The text blocks for the text input are "he asked for a coffee" and "with whipped cream". Further, for each of the text block, the plurality of features is determined such as the content of the text block, gender information and lingo usage information. For the text block "he asked for a coffee", the context here is the user 102 is talking about asking for a coffee, the word "he" is indicating male gender information and the word "coffee" is indicating lingo usage information. Similarly for the text block "with whipped cream" the content here is the user 102 is talking about whipped cream. Upon determining the plurality of features for each of the text block, usage pattern of the plurality of features is identified based on the historic data 211. Upon identifying the usage pattern, a personalized text is generated for the user 102. The personalized text includes an emoji of coffee cup inserted after the word coffee and an emoji of cream on a coffee cup is inserted after the word cream as shown in FIG. 5B. For example, consider the same example 500*b* in FIG. 5B, upon identifying the usage pattern of the plurality of features, a personalized text is generated for another user. The personalized text includes an emoji of coffee cup inserted after the word coffee and an emoji of cream on a coffee cup is inserted after the word cream with a different skin-tone colour and also the word coffee is spelled as "coffe" as per user's lingo usage as shown in example 500*c* FIG. 5C. Similarly, consider the text block entered by the user 102 is "lets meet at mortally". The feature determination module 202 determines the plurality of features of the text block such as the context of the text block and the contextual lingo information. For the text block "lets meet at mortally", the context may be that the user 102 is talking about meeting at a location. The "mortally" is indicating that the user 102 may be talking about a location starting which letter "m". Upon determining, the feature determination module 202 identifies the usage pattern of the contextual lingo information and a personalized text is generated for the user 102 as shown in example 500*d* FIG. 5D. Thus, a personalized text is provided to the user 102 before sending/sharing the message to a recipient. Referring back to FIG. 2, in an embodiment, enhancing of the multimodal input comprises performing grammar correction for each of the text blocks. In an embodiment, upon obtaining the text blocks with text boundaries, the grammar correction module 206 segments text of each of the text block into one or more words. Upon segmenting, the grammar correction module 206 segments the one or more words into plurality of sequence of characters of predefined size. Further, upon segmenting, the grammar correction module 206 corrects the plurality of sequence of characters using the N-gram model. In the correction of plurality of sequence of characters, the grammar correction module 206 matches the plurality of sequence of characters with prestored sequence of characters and assigs a probability value based on the matching. The grammar correction module 206 corrects the plurality of sequences of characters based on the probability value. Upon correction, the grammar correction module 206 generates embedding vectors for each of the plurality of corrected sequence using the NN model. Further, the grammar correction module 206 converts the output of the NN model into one or ore tokens of words and each of the one or more tokens of words are tagged using the NLP model. Upon converting, the grammar correction module 206 identifies errors in the one or more tokens of words and corrects the errors based on predefined rules using the NLP model.

Figure 4:
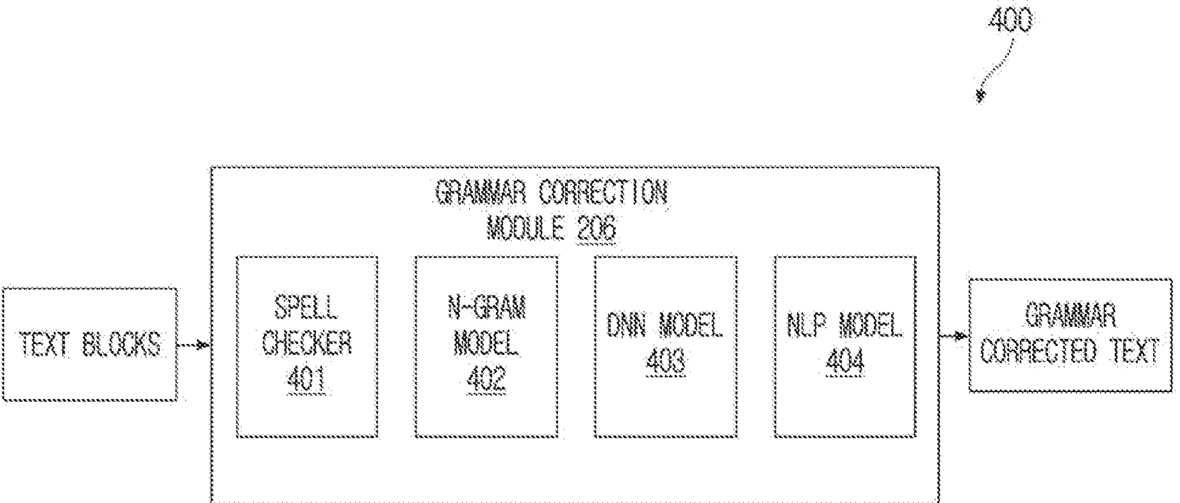
FIG. 4 illustrates a sequence diagram for performing grammar correction for at least one text block, in accordance with some embodiments of present disclosure.

For example, consider FIG. 4 for grammar correction of the multimodal input. The grammar correction module 206 receives the text blocks for the multimodal input. The text block may be "He return back to home". The text block is segmented into one or more words such as "He", "return" "back", "to" and "home". The spell checker 401 checks for any spelling errors for each of the one or more words of the text block. Further, the text block is provided to the N-gram model 402. The N-gram model 402 segments the one or more words into plurality of sequence of characters of a predefined sizes. The N-gram model 402 may include, but is not limited to, trigram model, bigram model and the like. For example, consider, the plurality of sequence of characters is of size three as the N-gram model 402 is a trigram model. The plurality of sequence of characters includes "He return", "he return back", "back to home", "to home". Upon segmenting, the N-gram model 402 matches the plurality of sequence of characters with prestored sequence of characters and assigns the probability value. Thus, the N-gram model 402 corrects the plurality of sequence of characters based on the probability value. The output of the N-gram model 402 is "He return back home". Further, the corrected plurality of sequence of characters is received by the NN model such as Deep Neural Network (DNN) model 403. The DNN model 403 generates embedding vectors for each of the plurality of sequence of characters. The embedding vectors are used to represent discrete variables with continuous numbers. The DNN model 403 provides an output for the text block such as "He returned back home". The output of the DNN model 403 is received by the NLP model 404. The NLP model 404 performs tokenization on the text blocks. The text blocks are tokenized into one or more tokens of words and the NLP model 404 tags the one or more tokens of words. The text block "He returned back home" is converted into the one or more tokens of words such as "He", "returned", "back" and "home". The one or more tokens are tagged as "He (pronoun)", "returned(verb)", "back (redundant word)" and "home (noun)". The NLP model 404 identifies the error based on tagging and corrects the one or more tokens of words. The output of the NLP model 404 is "He returned home", which is the grammar corrected text for the text block.

Consider example 500*a* in FIG. 5A, in which the text input provided by the user 102 is "He asked a coffee", the grammar correction module 206 performs the above explained steps and corrects the text input as "He asked for a coffee". The one or more modules 106 may also include other modules 207 such as training modules for training one or more models to perform various miscellaneous functionalities of the UE 101. It will be appreciated that such modules may be represented as a single module or a combination of different modules.

Figure 6:
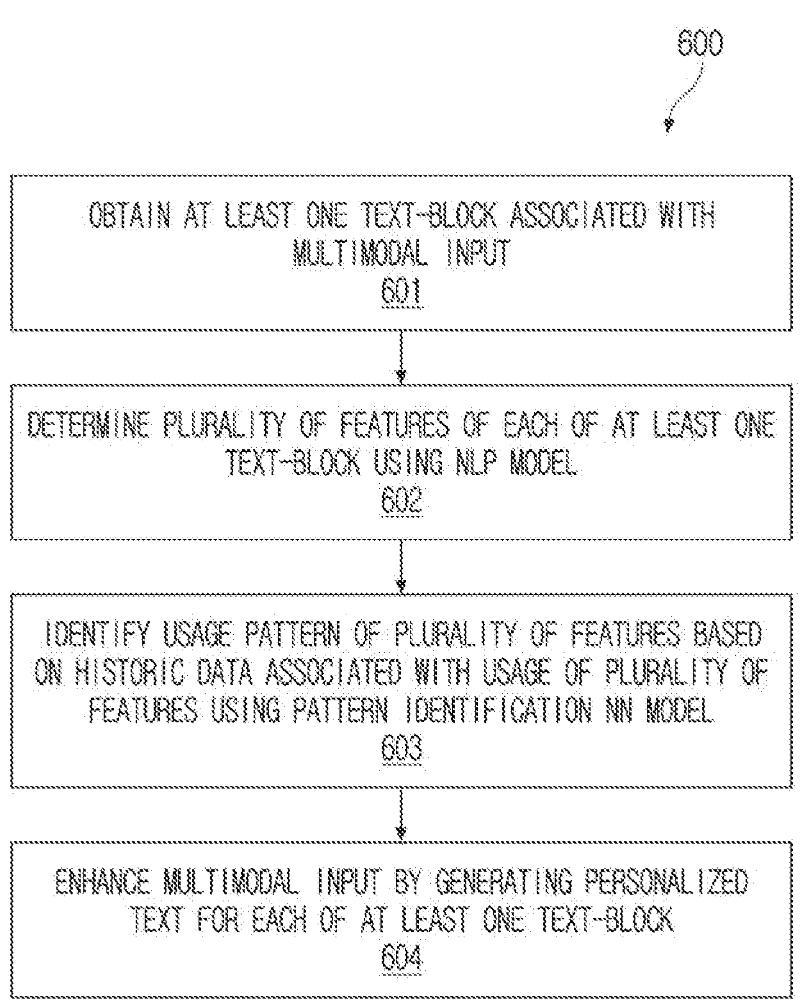
FIG. 6 illustrates a flow diagram showing an exemplary method for enhancing a multimodal input content, in accordance with some embodiments of present disclosure.
Figure 7:
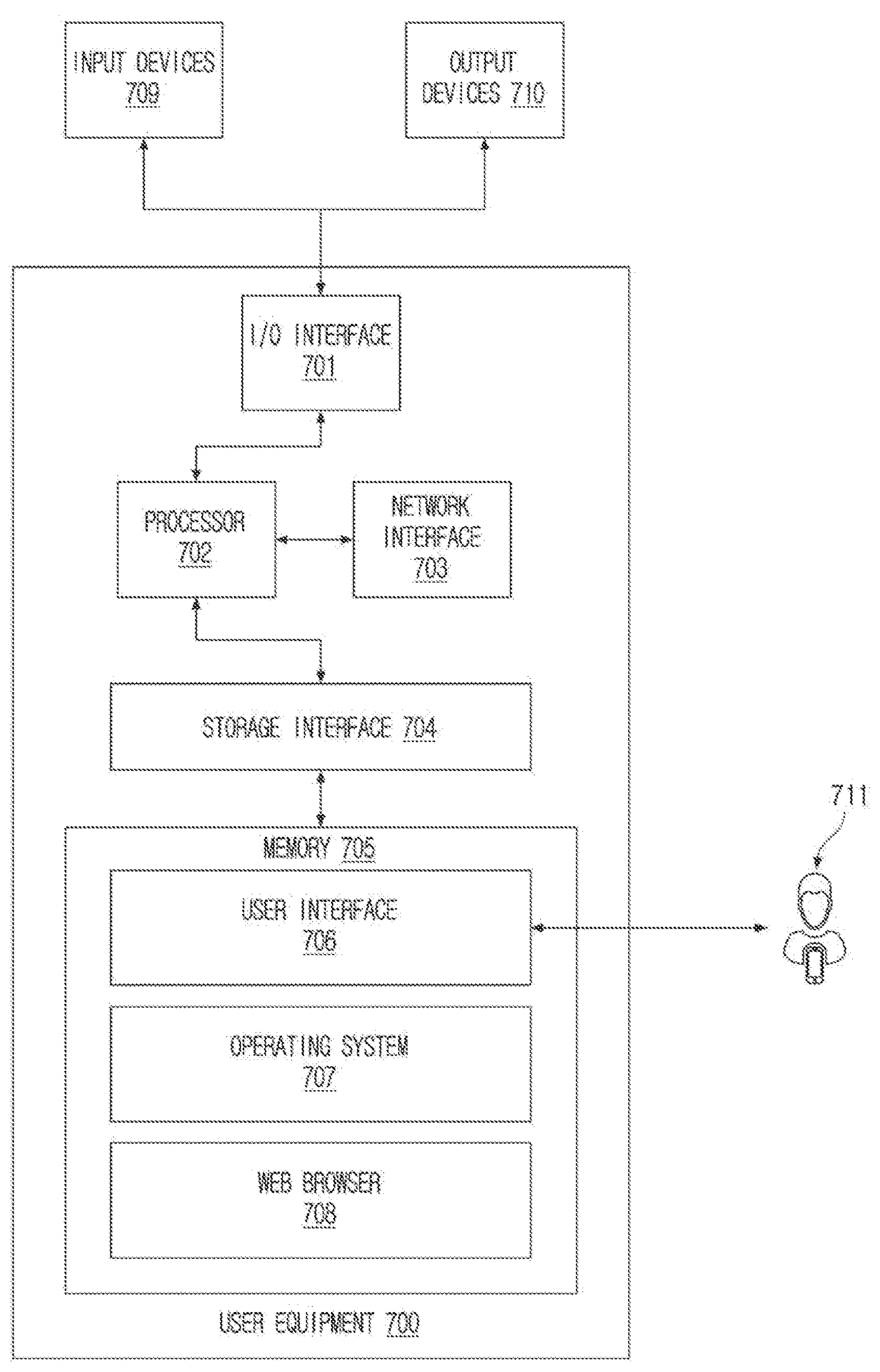
FIG. 7 illustrates a block diagram of an exemplary user equipment for implementing embodiments consistent with the present disclosure.

FIG. 6 illustrates a flow diagram showing an exemplary method for enhancing the multimodal input content, in accordance with some embodiments of present disclosure. As illustrated in FIG. 6, the method 600 may include one or more blocks for executing processes in the UE 101. The method 600 may be described in the general context of computer executable instructions. Generally, computer executable instructions can include routines, programs, objects, components, data structures, procedures, modules, and functions, which perform particular functions or implement particular abstract data types. The order in which the method 600 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof. At block 601, obtaining, by the receiving module 201, the at least one text block of the multimodal input. The multimodal input is one of a text message, voice message and an image input comprising text message. In an embodiment, obtaining the at least one text block comprises processing the multimodal input to detect one or more text boundaries. At block 602, determining, by the feature determination module 202, the plurality of features of each of the at least one text block using the NLP model. The plurality of features includes context of each of the at least one text block, gender information and the lingo usage information. At block 603, identifying, by the usage pattern identification module 203, the usage pattern of the plurality of features based on the historic data using the pattern identification NN model. The historic data is associated with the usage of the plurality of features. The historic data comprises usage of the emoticons and emojis, characteristic of the emoticons, lingo usage details and skin-tone feature of the emoticons. At block 604, enhancing, by the text enhancing module 204, the multimodal input by generating the personalized text for each of the at least one text block based on the plurality of features and usage pattern of the plurality of features. Particularly, at least one of one or more emoticons and one or more emojis are inserted by the text enhancing module 204 to the at least one text block with a preferred skin-tone based on the context of each of the at least one text block and a threshold value. The threshold value is preconfigured based on usage of the at least one of the one or more emoticons and the one or more emojis by the user 102. Further, inserting by the text enhancing module 204, lingo of each word of the at least one text block using the usage lingo database. The lingo database includes information related to plurality of lingo words frequently used by the user 102. Computing System FIG. 7 illustrates a block diagram of an exemplary User Equipment (UE) 700 for implementing embodiments consistent with the present disclosure. The UE 700 may include a central processing unit ("CPU" or "processor") 702. The processor 702 may include at least one data processor for enhancing a multimodal input content. The processor 702 may include specialized processing units such as, integrated system (bus) controllers, memory management control units, floating point units, graphics processing units, digital signal processing units, etc. The processor 702 may be disposed in communication with one or more input/output (I/O) devices 709 and 710 via I/O interface 701. The I/O interface 701 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc. Using the I/O interface 701, the UE 700 may communicate with one or more I/O devices 709 and 710. For example, the input devices 709 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 710 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc. In some embodiments, the UE 700 is configured to enhance the multimodal input content. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. In some embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc. The memory 705 may store a collection of program or database components, including, without limitation, user interface 706, an operating system 707 etc. Using the user interface 706, the UE 700 may communicate with a user 712 for enhancing the multimodal input content. In some embodiments, UE 700 may store user/application data 706, such as, the data, variables, records, etc., as described in this disclosure. Such databases may be implemented as fault-tolerant, relational, scalable, secure databases such as Oracle® or Sybase®. The operating system 707 may facilitate resource management and operation of the UE 700. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, etc.), APPLE® IOS™, GOGGLE® ANDROID™, BLACKBERRY® OS, or the like. In some embodiments, the UE 700 may implement a web browser 708 stored program component. The web browser 708 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browsers 708 may utilize facilities such as AJAX, DHTML, Adobe Flash, JavaScript, Java, Application Programming Interfaces (APIs), etc. In some embodiments, the UE 700 may implement a mail server stored program component. The mail server may be an Internet mail server such as Microsoft Exchange, or the like. The mail server may utilize facilities such as ASP, ActiveX, ANSI C++/C#, Microsoft .NET, Common Gateway Interface (CGI) scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the UE 700 may implement a mail client stored program component. The mail client may be a mail viewing application, such as Apple Mail, Microsoft Entourage, Microsoft Outlook, Mozilla Thunderbird, etc. Furthermore, one or more computer-readable storage media may be utilized in implementing embodiments consistent with the present disclosure. A computer readable storage medium refers to any type of physical memory on which information or data readable by a processor may be stored. Thus, a computer readable storage medium may store instructions for execution by one or more processors, including instructions for causing the processor(s) to perform steps or stages consistent with the embodiments described herein. The term "computer readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media. An embodiment of the present disclosure provisions a method for enhancing the multimodal input by personalizing the multimodal input based on historic data of the user. An embodiment of the present disclosure provides a method for detecting one or more text boundaries for the multimodal input to enhance the multimodal input. An embodiment of the present disclosure provides a method for providing grammar correction for the multimodal input based on the one or more text boundaries. An embodiment of the present disclosure eliminates manual correction of a message before sending/sharing to a recipient. The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMS, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.). An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art. The terms "an embodiment", "embodiment", "embodiments", "the embodiment", "the embodiments", "one or more embodiments", "some embodiments", and "one embodiment" mean "one or more (but not all) embodiments" unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise. A description of an embodiment with several components in communication with each other does not imply that all such components are required. On the contrary a variety of optional components are described to illustrate the wide variety of embodiments. When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself. The illustrated operations of FIG. 6 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units. Finally, the language used in the specification has been principally selected for readability and instructional purposes, and it may not have been selected to delineate or circumscribe the subject matter. It is therefore intended that the scope of the invention be limited not by this detailed description, but rather by any claims that issue on an application based here on. Accordingly, the disclosure of the embodiments is intended to be illustrative, but not limiting, of the scope of the invention, which is set forth in the following claims. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERENCE NUMERALS: REFERENCE NUMBER DESCRIPTION

100 Environment
101 User equipment
102 User
103 Processor
104 I/O interface
105 Memory
106 Modules
107 Data
201 Receiving module
202 Feature determination module
203 Usage pattern identification module
204 Text enhancing module
205 Text boundary detection module
206 Grammar correction module
207 Other modules
208 Text data
209 Input data
210 Feature data
211 Historic data
212 Usage pattern data
213 Personalized texts
214 Threshold value
215 User lingo data
216 Training data
217 Corrected data
218 Character sequence data
219 Other data
300 Text boundary detection
401 Spell checker
402 N-gram model
403 DNN model
404 NLP model
700 User Equipment
701 I/O Interface
702 Processor

703 Network Interface
704 Storage Interface
705 Memory
706 User Interface
707 Operating System
708 Web Browser
709 Input Devices
710 Output Devices
711 User

What is claimed is:

1. A method for enhancing a multimodal input content, the method comprising:

obtaining, by a processor of a user equipment (UE), at least one text-block associated with a multimodal input;

determining, by the processor, a plurality of features of each of the at least one text-block using a natural language processing (NLP) model, wherein the plurality of features comprises a context of each of the at least one text-block and at least one of gender information, contextual lingo information, and lingo usage information;

identifying, by the processor, a usage pattern of the plurality of features based on historic data associated with usage of the plurality of features using a pattern identification neural network (NN) model, wherein the historic data comprises at least one of usage of emoticons and emojis, characteristics of emoticons, lingo usage details, and skin-tone features of emoticons; and enhancing, by the processor, the multimodal input by generating a personalized text for each of the at least one text-block based on the determined plurality of features and the identified usage pattern of the plurality of features, wherein generating the personalized text for each of the at least one text-block comprises:

inserting, by the processor, at least one of one or more emoticons and one or more emojis to the at least one text-block with a skin-tone associated with a usage pattern of a user, based on the context of each of the at least one text-block and a threshold value, wherein the threshold value is preconfigured based on a usage of the at least one of the one or more emoticons and the one or more emojis by the user; and inserting, by the processor, lingo of each word of the at least one text-block using a user lingo database, wherein the user lingo database comprises information related to a plurality of lingo words frequently used by the user.

2. The method as claimed in claim 1, wherein the threshold value corresponds to a probability value based on which the at least one of the one or more emoticons and the one or more emojis are inserted at one or more sentences associated with the at least one text-block.

3. The method as claimed in claim 1, wherein the multimodal input is at least one of a text message, voice message, and an image input comprising a text message.

4. The method as claimed in claim 1, wherein obtaining the at least one text-block comprises processing the multimodal input to detect one or more text boundaries.

5. The method as claimed in claim 4, wherein detecting the one or more text boundaries comprises:

receiving, by the processor, the multimodal input from a user;

processing, by the processor, text associated with the multimodal input using one or more predefined rules;

converting, by the processor, the processed text into one or more tokens;

indexing, by the processor, the one or more tokens, wherein each of the indexed one or more tokens are padded with predefined bytes;

creating, by the processor, one or more sets of the one or more tokens using the one or more padded tokens, wherein each set of the one or more sets is of a predefined size; and detecting, by the processor, the one or more text boundaries for each of the one or more sets of the one or more tokens using an NN model and an NLP model.

6. The method as claimed in claim 5, wherein the NN model is trained based on a plurality of text input having predefined text boundaries.

7. The method as claimed in claim 5, wherein the NLP model improves the one or more text boundaries based on predefined rules.

8. The method as claimed in claim 1, further comprising enhancing the multimodal input by performing grammar correction and enhancement for each of the at least one text-block by:

segmenting, by the processor, text from each of the at least one text-block into one or more words;

segmenting, by the processor, the one or more words into a plurality of sequence of characters of predefined size;

correcting, by the processor, the plurality of sequence of characters using an N-gram model;

generating, by the processor, embedding vectors for each of the corrected plurality of sequence of characters using a grammar correction NN model;

converting, by the processor, output of the grammar correction NN model into one or more tokens of words, wherein each of the one or more tokens of words is tagged using an NLP model;

identifying, by the processor, one or more errors in the one or more tokens of words based on the tagging; and correcting, by the processor, errors for the one or more tokens of words based on predefined rules using the NLP model.

9. The method as claimed in claim 8, wherein correcting the plurality of sequence of characters using the N-gram model, comprises:

matching, by the processor, the plurality of sequence of characters with a prestored sequence of characters and assigning a probability value based on the matching; and correcting, by the processor, the plurality of sequence of characters based on the probability value.

10. A User Equipment (UE) for enhancing a multimodal input content, comprising:

a processor; and a memory communicatively coupled to the processor, wherein the memory is configured to store processor-executable instructions, which, on execution, causes the processor to:

obtain at least one text-block associated with a multimodal input;

determine a plurality of features of each of the at least one text-block using a natural language processing (NLP) model, wherein the plurality of features comprises context of each of the at least one text-block and at least one of gender information, contextual lingo information, and lingo usage information;

identify a usage pattern of the plurality of features based on historic data associated with usage of the plurality of features using a pattern identification neural network (NN) model, wherein the historic data comprises at least one of usage of emoticons and emojis, characteristics of emoticons, lingo usage details, and skin-tone features of emoticons; and enhance the multimodal input by generating a personalized text for each of the at least one text-block based on the determined plurality of features and the identified usage pattern of the plurality of features, wherein the processor is configured to generate the personalized text for each of the at least one text-block by:

inserting at least one of one or more emoticons and one or more emojis to the at least one text-block with a skin-tone associated with usage pattern of a user, based on the context of each of the at least one text-block and a threshold value, wherein the threshold value is preconfigured based on usage of the at least one of the one or more emoticons and the one or more emojis by the user; and inserting lingo of each word of the at least one text-block using a user lingo database, wherein the user lingo database comprises information related to a purality of lingo words frequently used by the user.

11. The non-transitory computer-readable recording medium having recorded thereon a program, which when executed by a computer, performs a method comprising:

obtaining, by a processor of a user equipment (UE), at least one text-block associated with a multimodal input;

determining, by the processor, a plurality of features of each of the at least one text-block using a natural language processing (NLP) model, wherein the plurality of features comprises a context of each of the at least one text-block and at least one of gender information, contextual lingo information, and lingo usage information;

identifying, by the processor, a usage pattern of the plurality of features based on historic data associated with usage of the plurality of features using a pattern identification neural network (NN) model, wherein the historic data comprises at least one of usage of emoticons and emojis, characteristics of emoticons, lingo usage details, and skin-tone features of emoticons; and enhancing, by the processor, the multimodal input by generating a personalized text for each of the at least one text-block based on the determined plurality of features and the identified usage pattern of the plurality of features, wherein generating the personalized text for each of the at least one text-block comprises:

inserting, by the processor, at least one of one or more emoticons and one or more emojis to the at least one text-block with a skin-tone associated with a usage pattern of a user, based on the context of each of the at least one text-block and a threshold value, wherein the threshold value is preconfigured based on a usage of the at least one of the one or more emoticons and the one or more emojis by the user.

12. The non-transitory computer-readable recording medium as claimed in claim 11, wherein the threshold value corresponds to a probability value based on which the at least one of the one or more emoticons and the one or more emojis are inserted at one or more sentences associated with the at least one text-block.

13. The non-transitory computer-readable recording medium as claimed in claim 11, wherein the multimodal input is at least one of a text message, voice message, and an image input comprising a text message.

14. The non-transitory computer-readable recording medium as claimed in claim 11, wherein obtaining the at least one text-block comprises processing the multimodal input to detect one or more text boundaries.

15. The non-transitory computer-readable recording medium as claimed in claim 14, wherein detecting the one or more text boundaries comprises: receiving, by the processor, the multimodal input from a user;

processing, by the processor, text associated with the multimodal input using one or more predefined rules;

converting, by the processor, the processed text into one or more tokens;

indexing, by the processor, the one or more tokens, wherein each of the indexed one or more tokens are padded with predefined bytes;

creating, by the processor, one or more sets of the one or more tokens using the one or more padded tokens, wherein each set of the one or more sets is of a predefined size; and detecting, by the processor, the one or more text boundaries for each of the one or more sets of the one or more tokens using an NN model and an NLP model.

* * * * *